United States Patent [19]

Roinestad

[11] 4,078,655
[45] Mar. 14, 1978

[54] SMALL RADIUS CONVEYOR BELT AND CONVEYING SYSTEM

[75] Inventor: Gerald C. Roinestad, Winchester, Va.

[73] Assignee: Ashworth Bros., Inc., Fall River, Mass.

[21] Appl. No.: 771,850

[22] Filed: Feb. 25, 1977

[51] Int. Cl.² .......................................... B65G 17/08
[52] U.S. Cl. .................................. 198/848; 198/778; 198/852; 198/853
[58] Field of Search ............... 198/778, 831, 844, 848, 198/849, 850, 851, 852, 853

[56] References Cited

U.S. PATENT DOCUMENTS

| Re. 27,690 | 7/1973 | Roinestad et al. | 198/852 |
|---|---|---|---|
| 2,778,480 | 1/1957 | Dobbins | 198/853 |
| 3,225,898 | 12/1965 | Roinestad | 198/852 |
| 3,261,451 | 7/1966 | Roinestad | 198/852 |
| 3,333,678 | 8/1967 | Rodman | 198/852 |
| 3,348,659 | 10/1967 | Roinestad | 198/778 |
| 3,467,239 | 9/1969 | Roinestad | 198/852 |
| 3,536,183 | 10/1970 | Locke | 198/778 |
| 3,664,487 | 5/1972 | Ballenger | 198/778 |
| 3,938,651 | 2/1976 | Alfred et al. | 198/833 |
| 3,991,876 | 11/1976 | Schmidt, Sr. et al. | 198/851 |

FOREIGN PATENT DOCUMENTS

| 76,794 | 7/1954 | Netherlands | 198/850 |

Primary Examiner—Bruce H. Stoner, Jr.
Assistant Examiner—Richard K. Thomson
Attorney, Agent, or Firm—Schuyler, Birch, Swindler, McKie & Beckett

[57] ABSTRACT

A small radius conveyor belt for traveling along both straight and laterally curved paths and a conveyor system including such belt is shown. A plurality of rods extend across the belt and are pivotally connected together by tractive central links and inner and outer edge links which are longitudinally expandable and collapsible. The inner links are fully expanded and the outer links are collapsed in the straight path. The inner links collapse and the outer links expand to allow the belt to bend around the curve.

24 Claims, 9 Drawing Figures

SMALL RADIUS CONVEYOR BELT AND CONVEYING SYSTEM

BACKGROUND OF THE INVENTION

1. Field of the Invention

The present invention relates generally to conveyor systems and belts therefor and, more particularly, to conveyor belts capable of traversing relatively small radius horizontal curves.

2. Background of the Prior Art

At least three types of conveyor belts are in general use today for carrying diverse products along both straight and horizontally curved paths. The first type generally referred to as a grid belt is illustrated in U.S. Pat. No. 3,225,898. Such a belt comprises a plurality of spaced transverse rods slidably interconnected by two rows of connecting links disposed along the inner and outer edges of the rods. The connecting links are disposed in a nested relationship relative to one another with slots in the links slidably receiving the rods. Either edge of the belt can suitably collapse when it is necessary for the belt to travel around a horizontal curve.

The second type of belt, generally referred to as a flat wire belt, is illustrated in U.S. Pat. No. Re. 27,690. In the flat wire belt, the transverse rods are slidably interconnected by transversely disposed flat wire tractive links having a width spanning substantially the entire length of the rods. The tractive links comprise a plurality of longitudinally disposed tractive members secured together by transversely disposed connecting members to form a plurality of U-shaped segments. Longitudinal slots are provided in the tractive members for slidably receiving the rods. As in the case of the grid type belt, the tractive links are arranged in a nested relationship relative to one another to enable the belt to collapse along either edge to traverse horizontal curves. In addition, reinforcing bar links are often placed along the outer edges of the flat wire belt for bearing the tractive load on the belt as it traverses the curve to prevent fatigue failure of the flat wire links.

The third type of belt noted above, which may be referred to as the center pull belt, is illustrated generally in U.S. Pat. No. 3,467,239 and the British Pat. No. 738,806 to Ravestein. In this type, the transversely disposed rods are connected at their central portions by tractive links or a chain, which carries the entire tractive load as the belt travels both in a straight path and around horizontal curves. When the belt is traversing such a curve, the inner ends of the rods will move closer together and the outer ends of the rods will separate. Although the rods in these belts are often unconnected to each other, except for their attachment to the center pull device, nontractive support links have been placed between the rods to help carry the products placed thereon as shown in the Ravestein patent.

Grid and flat wire belts have enjoyed substantial commercial success because of their ability to traverse horizontal curves while still providing an integrated carrying surface capable of supporting a great variety of products. Another desirable feature of such belts is that they can pass freely in vertical curves around relatively small end pulleys. However, these belts have the disadvantageous limitation of a relatively large horizontal turning radius which limits their usefulness in some conveyor installations. For example, this disadvantage limits the width of the belt and thus its carrying capacity in certain low tension conveying systems of the type generally shown in U.S. Pat. No. 3,348,659.

The center pull belts have not met with substantial success and have definite disadvantages. The entire tractive load on such a belt is always borne by the center pull device. Thus, a relatively large and strong center pull device is required. Moreover, the lack of any tractive connection or other adequate support along the outer rod ends renders the edges of the belt very unstable. In addition, the center chain pull belts, as exemplified by Ravestein, require relatively large end pulleys.

SUMMARY OF THE INVENTION

Accordingly, it is an object of this invention to provide a conveyor belt of the grid or flat wire type which is stable in operation and capable of traversing relatively small radius horizontal curves.

It is a further object of the present invention to provide an improved small radius conveyor belt of the grid or flat wire type having an increased load carrying capacity in a low tension conveying system.

The invention broadly relates to a conveyor belt having a normal orientation to follow one path, preferably straight, and alternate orientations with a collapsed inner edge and an expanded outer edge to follow alternate paths curved laterally to one side of the normal path. The belt comprises a plurality of longitudinally spaced rods extending laterally across the belt and having inner and outer ends along the inner and outer edges of the belt and central portions therebetween. Central link means, including central links, arranged in at least one longitudinal row, pivotally interconnect the central portions of the rods. The central link means have a tractive condition with the rods in the normal orientation and in at least some of the alternate curved orientations. Edge link means are arranged in at least one longitudinal row along each edge of the belt and include inner links and outer links pivotally interconnecting the inner and outer ends of said rods. The edge link means are longitudinally collapsible and expandable along their rows. The inner links have a normal fully expanded and tractive condition in the normal orientation and a collapsed condition in the alternate curved orientations, whereas the outer links have a normal collapsed condition in the normal orientation and are expanded from such normal condition in the alternate curved orientations.

The invention also includes a conveyor system having a substantially straight portion and a laterally curved portion with a conveyor belt having a normal orientation for following the substantially straight portion and an alternate orientation for following the curved portion. The belt defines a concave inner edge and a convex outer edge along the curved portion and includes a plurality of longitudinally spaced rods extending laterally across the belt and having inner and outer ends along the inner and outer edges of the belt and central portions therebetween. Edge link means are arranged in at least one longitudinal row along each edge of the belt and include inner links and outer links interconnecting the inner and outer ends of the rods. The edge link means are collapsible and expandable along their rows. The conveyor system also includes tensioning means engaging the conveyor belt along the straight portion and friction edge drive means engaging the concave inner edge of the conveyor belt at a plurality of locations along the curved portion to frictionally drive the belt along the curved portion under a substantially lower tension than along the straight portion. The conveyor belt further comprises central link means including central links arranged in at least one longitudinal row pivotally interconnecting the central portions of the rods. The central link means and the inner links have a tractive condition in the normal orientation to share the tractive load on the belt. The inner links collapse as the belt curves laterally from the normal orientation to transfer the tractive load on the belt to the central link means, and the outer links have a collapsed and nontractive condition in the normal orientation and expand from such collapsed condition in the alternate orientation.

BRIEF DESCRIPTION OF THE DRAWINGS

The novel features of the invention are set out with particularity in the appended claims, but the invention will be understood more fully and clearly from the following detailed description of preferred embodiments with reference to the accompanying drawings in which:

DESCRIPTION OF PREFERRED EMBODIMENTS

Figure 1:
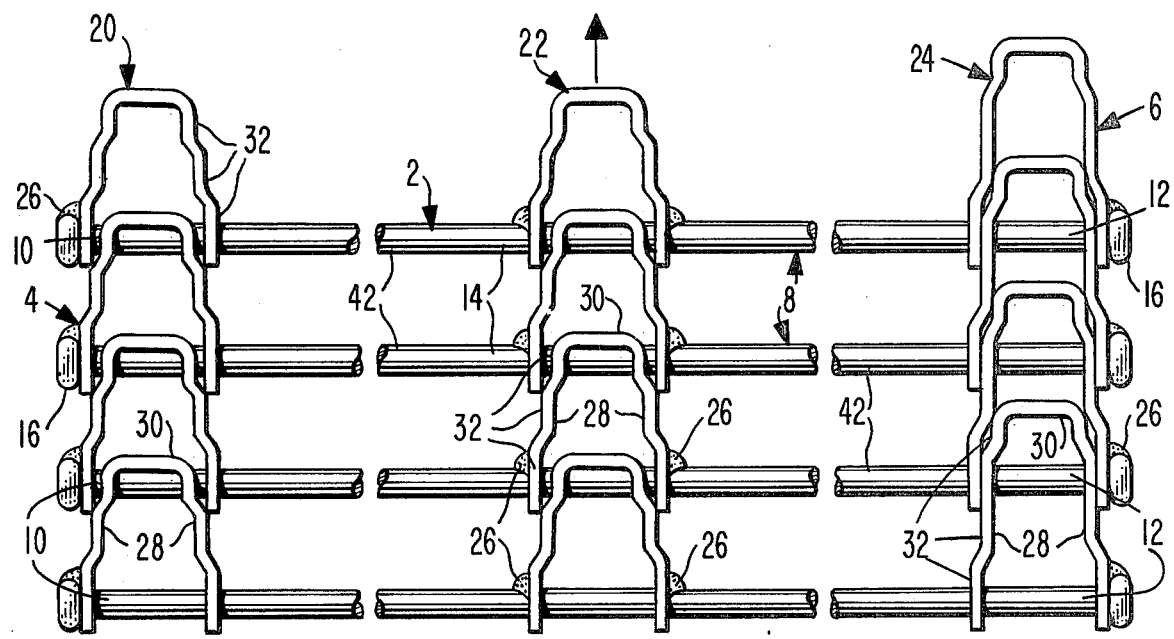
FIG. 1 is a plan view of a first embodiment of a small radius conveyor belt according to the present invention in a normal orientation to follow a straight path.

Referring to FIGS. 1-5, a small radius conveyor belt 2 is depicted according to a first embodiment of the present invention. Belt 2 is illustrated in FIG. 1 in a normal orientation for traveling in a straight path and in FIG. 2 in an alternate orientation for following horizontally curved paths. Unlike conventional grid or flat wire belts which can collapse along either edge, a belt 2 according to the present invention can collapse only along its inner edge 4. Outer edge 6 of belt 2 cannot be collapsed, but only expanded, from its normal orientation. Therefore, belt 2 is adapted to traverse horizontal curves all of which bend in the same direction, i.e., to the same side, relative to the normal straight path.

Belt 2 is a grid type belt comprising a plurality of longitudinally spaced, transversely extending rods 8. Rods 8 have inner and outer ends 10 and 12 located respectively along the inner and outer edges 4 and 6 of belt 2 with central portions 14 extending between the inner and outer ends 10 and 12. Each of the rod ends 10 and 12 is provided with an integral, enlarged head 16.

Pivotally interconnecting the rods 8 are a row of inner links 20 connecting the inner ends 10 of the rods 8, a row of central links 22 connecting the central portions 14 and a row of outer links 24 connecting the outer ends 12 of rods 8. Inner and outer links 20 and 24 are rigidly secured by welded attachments 26 to the enlarged heads 16 on the rod ends. Similarly, the central links 22 have welded attachments 26 to the central portions 14 of the rods 8. However, any other suitable means of laterally fixing the connecting links to rods 8 could be used.

Each of the connecting links 20, 22 and 24, in their preferred form, comprises two transversely spaced, longitudinally extending legs 28 connected together at one end by a base portion 30. Legs 28 have a plurality of stepped portions 32 resulting in base portion 30 being narrower than legs 28 at their free ends to allow the links to be suitably nested together with the narrow base portion 30 received between the free ends of the legs 28 of an adjoining link. Stepped portions 32 also increase the lateral stability of the links and the belt 2 since they allow a relatively close sliding fit between the legs 28 of nested adjoining links. The stepped construction of the links is conventional and described in greater detail in U.S. Pat. No. 3,225,898.

Figure 3:
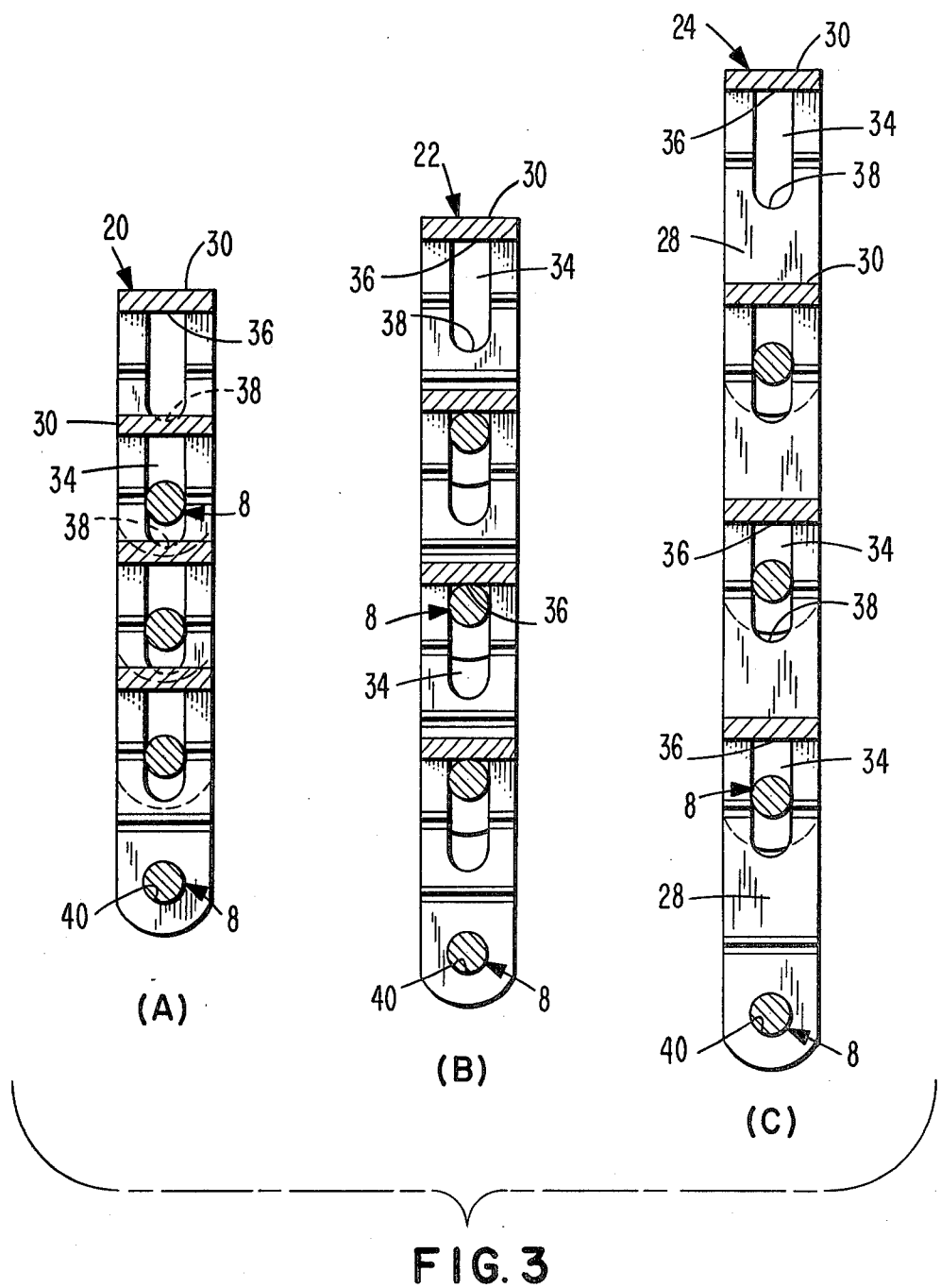
FIGS. 3, 4 and 5 are cross-sectional views each taken along the lines A, B and C of FIG. 2 showing the belt of FIG. 1 in different curved orientations.

Referring now to FIG. 3, the legs 28 of each of the links 20, 22 and 24 are provided with longitudinally extending slots 34 positioned adjacent the base portion 30 of the links. The front end 36 of each slot 34 is located directly adjacent base portion 30 which thus forms a front bearing surface for a rod 8 slidably received in slot 34. Similarly, the rear end 38 of each slot 34 forms a rear bearing surface for the rod 8. A circular opening 40 is also provided in each of the legs 28 adjacent the free end thereof for receiving an adjoining rod 8 in a close fitting relationship. Rods 8 are freely pivotal in the slots 34 so that belt 2 is vertically flexible to pass vertically around suitable end pulleys in a typical conveyor installation.

All of the connecting links are longitudinally expandable and collapsible by virtue of the slots 34 provided therein. However, outer links 24 are substantially longer than the inner and central links 20 and 22. Moreover, when the belt 2 is in its normal orientation, the slots 34 in the outer links 24 extend forwardly in front of the slots 24 in the inner and central links so that the outer links 24 can be collapsed when the inner and central links 20 and 22 are fully expanded. In such a position as shown in FIG. 1, the rear bearing surface 38 of slots 34 in the outer links 24 is preferably positioned to contact the rods 8 at the same time that such rods 8 are contacting the front bearing surfaces, i.e., the base portions 30, of the inner and central links 20 and 22. Thus, outer links 24 cannot collapse any further when the inner and central links 20 and 22 are fully expanded thereby giving added stability to the outer edge 6 of belt 2.

Referring now to FIG. 1, when conveyor belt 2 is traveling in its normal orientation to follow a straight path, the inner and central links 20 and 22 are fully expanded with the rods 8 engaging the base portion 30 of each of the links in a tractive driving relationship. Consequently, the entire tractive load on belt 2 is being shared between the inner and central links 20 and 22. Such a sharing of the load is desirable since the tractive load on belt 2 arising from a conventional drive, such as a sprocket, may be quite high over a long straight path. However, because of the design of the outer links 24, these links 24 are fully collapsed when the inner and central links 20 and 22 are fully expanded so that no tractive engagement occurs between the rods 8 and the base portions 30 of the outer links 24 in the normal straight orientation of belt 2. Although outer links 24 are not in a driving engagement with the rods 8, they nonetheless add stability and support to the outer edge 6 of the belt 2 through the nested relationship of the links 24 and the close proximity of the stepped portions 32 on adjoining links.

Figure 2:
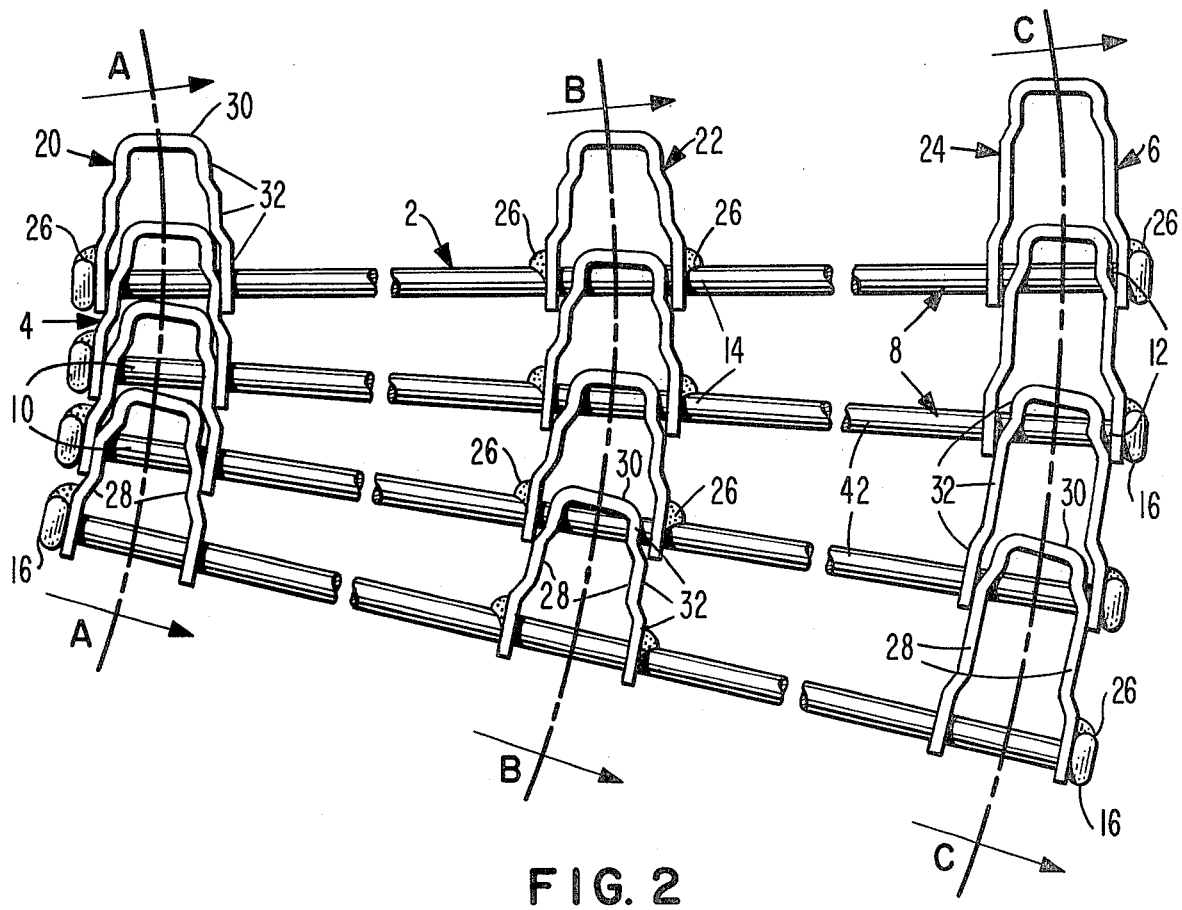
FIG. 2 is a plan view of the embodiment of FIG. 1 in an alternate orientation to follow a laterally cuved path.

Referring now to FIG. 2, as the belt 2 moves from its normal orientation to one of its alternate orientations for following a laterally curved path, the inner links 20 immediately begin collapsing from their fully expanded position, the outer links 24 begin expanding from their fully collapsed position and the central links 22 remain approximately in their fully expanded position. However, the final position of the links relative to the rods 8 will depend on two variables: (1) the design characteristics of the particular belt 2 being used including the length of the outer links 24 and the dimensioning of the slots 34 therein relative to the inner and central links 20 and 22, and (2) the radius of the particular horizontal curve being traversed.

Figure 4:
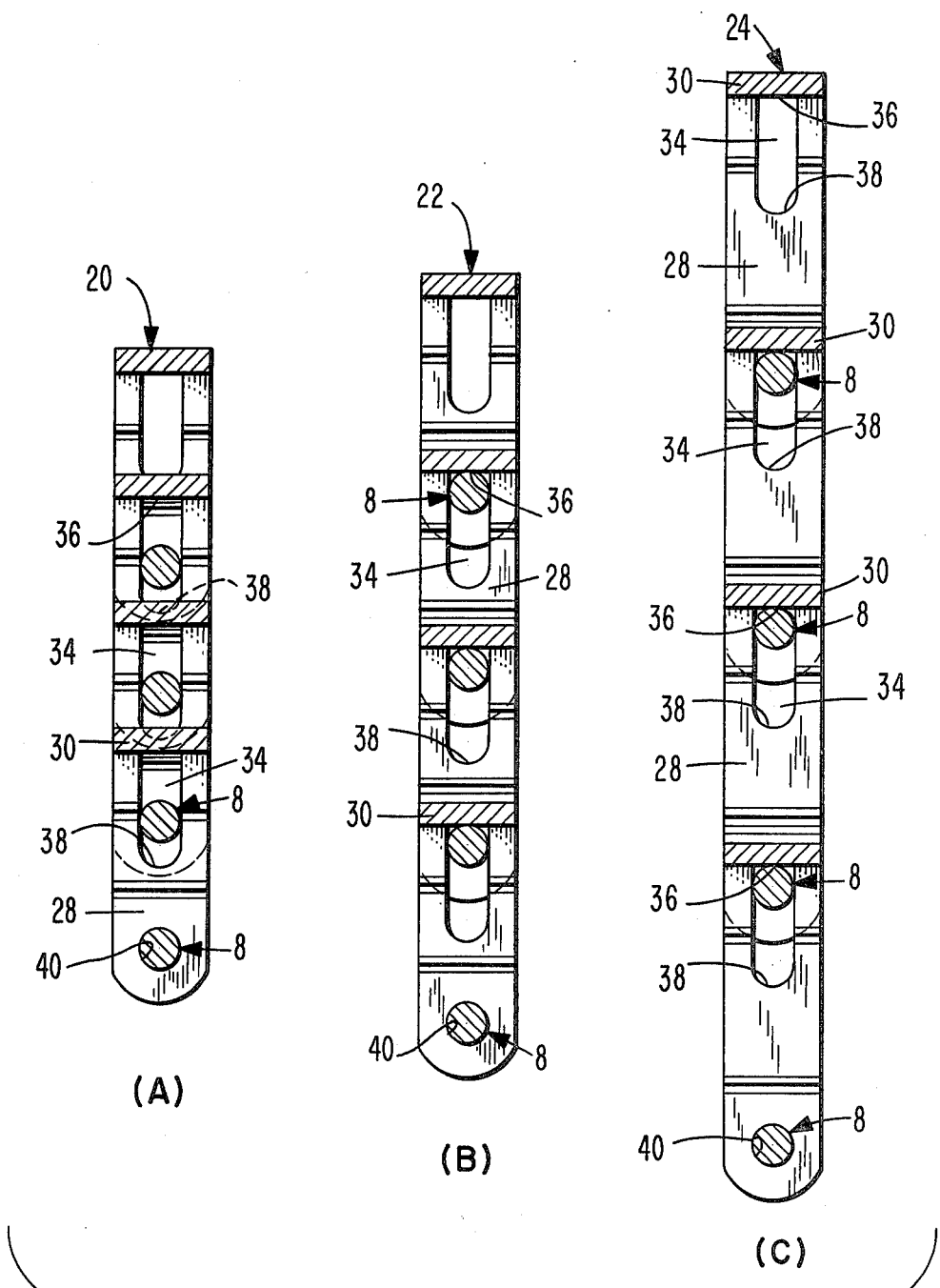
Figure 5:
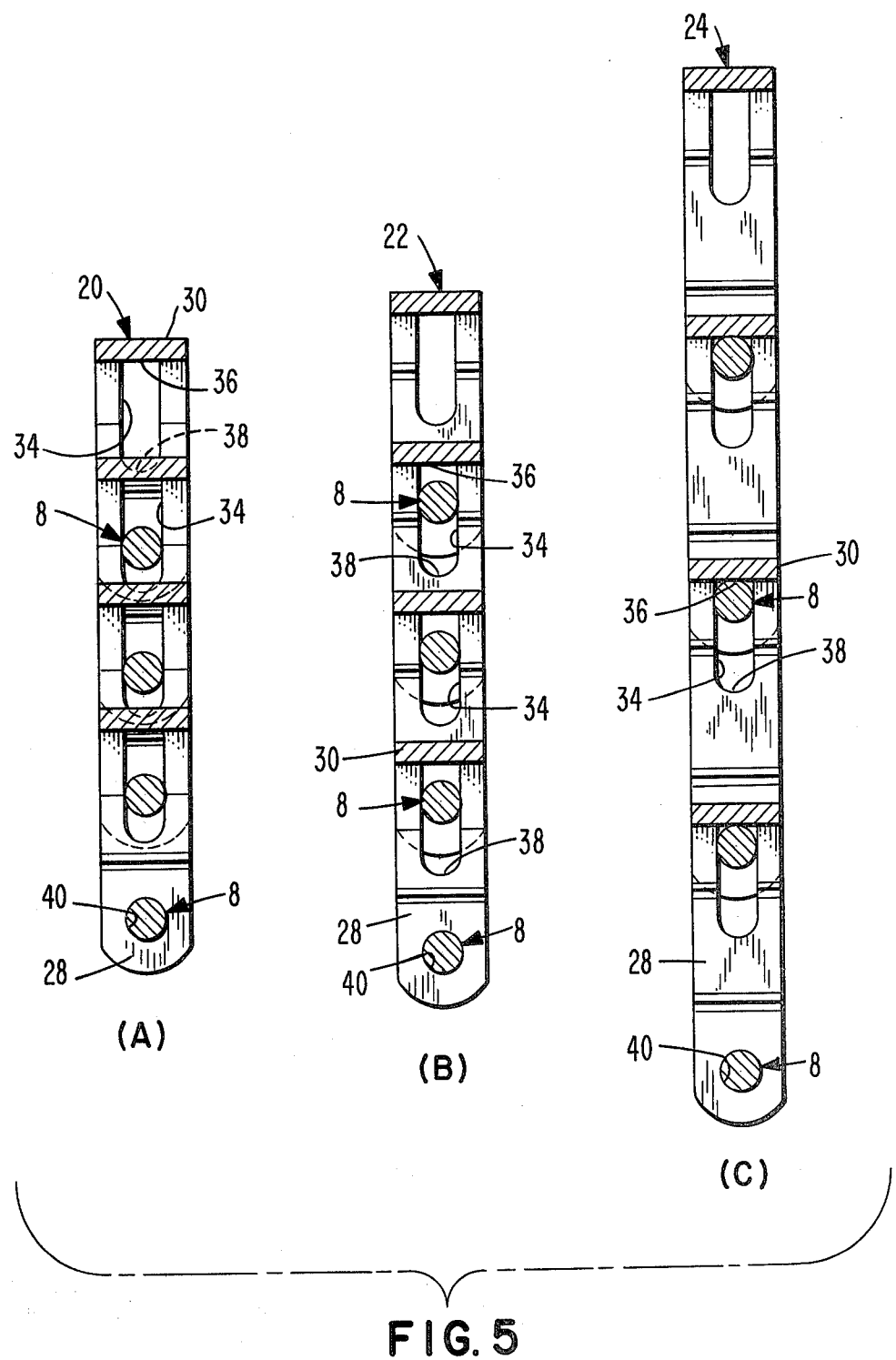

The tractive condition of the belt 2 in its normal straight orientation is always the same, the load being shared by the inner links 20 and the central links 22. As illustrated in FIGS. 3, 4 and 5, the belt 2 may be subjected to three different tractive conditions as the belt is traveling around laterally curved paths of varying radii. The first tractive condition is illustrated in FIG. 3 and occurs as soon as the belt begins to curve away from its normal orientation. Thus, the tractive load on belt 2 is transferred from the inner and central links 20 and 22 in the normal straight orientation to the central links 22 alone in the alternate curved orientation. In this event, only the central links 22 are fully expanded to maintain a tractive engagement with the rods 8. Inner links 20 will have collapsed sufficiently to traverse the curve before the outer links 24 have become fully expanded. This first tractive condition continues as the radius of the curve decreases so long as the outer links do not reach full expansion. In fact, the inner links 20 may be designed to be fully collapsed before the outer links are fully expanded in which case the outer links 24 would never share the tractive load on belt 2 although they would still be useful in stabilizing the outer ends 12 of rods 8, particularly in view of their stepped construction.

The second tractive condition is shown in FIG. 4 and occurs where the radius of the curve decreases to the point where the outer links 24 are fully expanded. At that point, the central links 22 remain fully expanded and the tractive load is shared by the central and outer links 22 and 24. In such an orientation, the base portions 30 of both the central and outer links 22 and 24 provide bearing surfaces at the forward ends of the slots 34 in tractive engagement with rods 8. To achieve such a result, belt 2 is designed with the inner links 20 having sufficient collapsibility to permit the outer links 24 to reach their fully expanded position. If desired, the inner links may not yet be fully collapsed. However, the inner links 20 may be designed to reach a fully collapsed condition simultaneously as the outer links 24 reach a fully expanded condition. This latter design results in a very stable belt.

The third and final tractive condition is shown in FIG. 5 and occurs when the tractive load on belt 2 is borne by the outer links 24 alone in an alternate orientation of very small radius. To reach the third tractive condition, the belt 2 must be designed so that the outer links 24 will become fully expanded before the inner links 20 are fully collapsed. With the belt 2 traveling under the second tractive condition with both the central and outer links 22 and 24 fully expanded, in order to traverse a still smaller radius curve, then inner links 20 must collapse even further to follow that curve. Such a further collapse of the inner links 20 will also cause the central links 22 to collapse from their fully expanded position leaving only the outer links 24 still fully expanded. Thus, in the third tractive condition, the tractive load on the belt is transferred to and borne by the outer links 24 alone. From the foregoing description, it can be seen that a belt 2, in which the inner links 20 reach full collapse before the outer links 24 reach full expansion, can only be subjected to the first tractive condition. A belt 2 in which the inner and outer links reach, respectively, full collapse and full expansion simultaneously can only be subjected to the first and second tractive conditions. A belt 2 in which the outer links 24 reach full expansion before the inner links 20 reach full collapse can be subjected to all three tractive conditions.

Although belt 2 in its normal orientation preferably travels in a straight path, it could also be designed to travel a slightly curved path in the normal orientation.

Central links 22 need not necessarily be provided with a longitudinal slot 34 allowing the central links 22 to be longitudinally collapsible and expandable. Such a slot 34 in the central links 22 could be replaced with any type of connection which permits the rods to be pivoted in the plane of the belt about the central links thus permitting collapse and expansion of the inner and outer links. In such a modified embodiment, the central links generally would be tractive in all belt orientations.

The links are relatively narrow compared to the width of the belt leaving substantially long segments 42 of the rods 8 extending between adjacent rows of the links. These segments 42 provide the load bearing surface which actually carries the products disposed on belt 2. The load carrying ability of the rod segments 42 may be enhanced by covering them with a spiral overlay fabric having the ability to collapse as the belt collapses. In addition, it would also be possible to offset the rod segments 42 upwardly so that the top of the segments 42 and the top of the links are always in the same horizontal plane.

Figure 6:
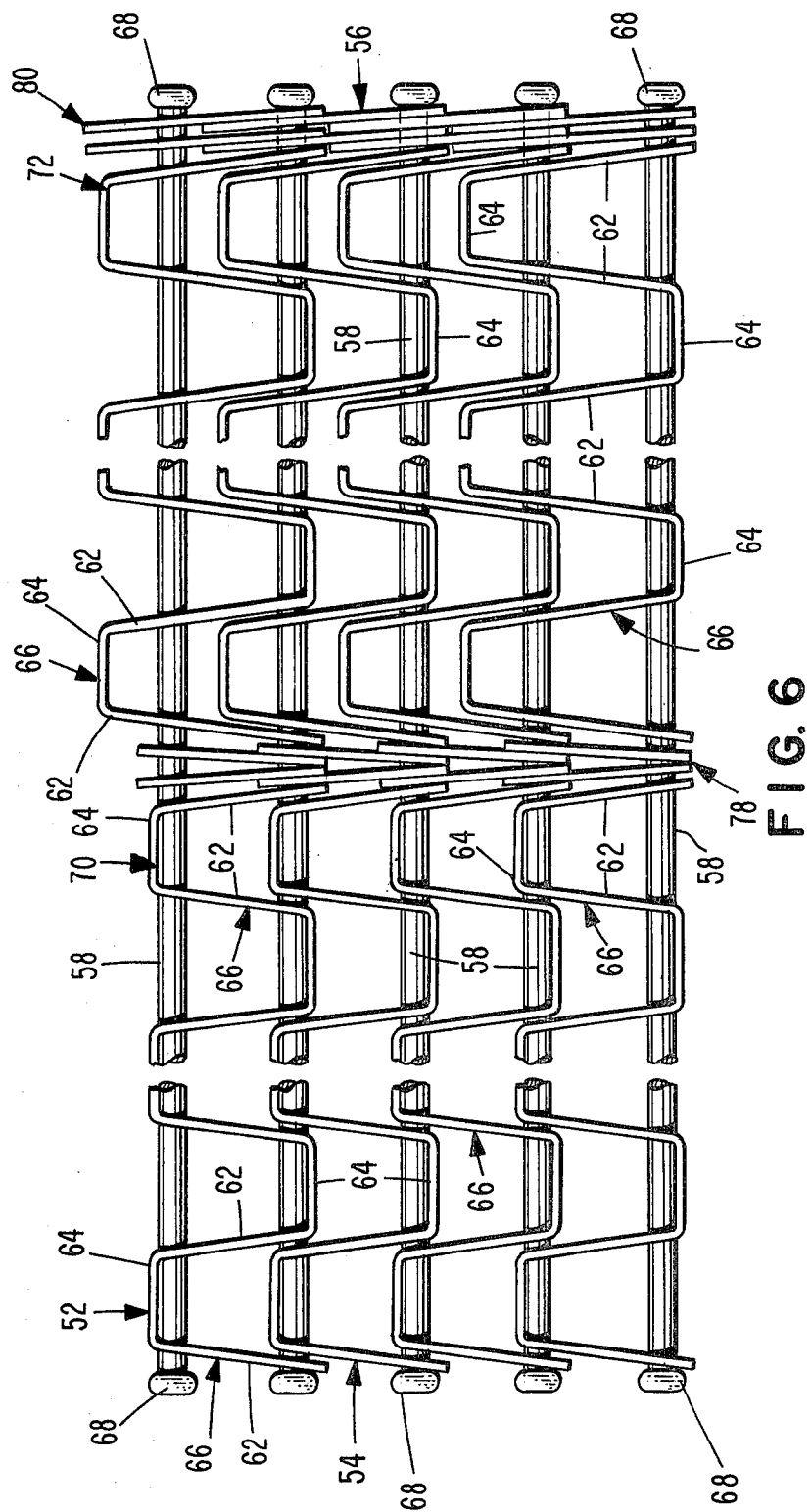
FIG. 6 is a plan view of a second embodiment of a small radius conveyor belt according to the present invention in a normal orientation to follow a straight path.
Figure 7:
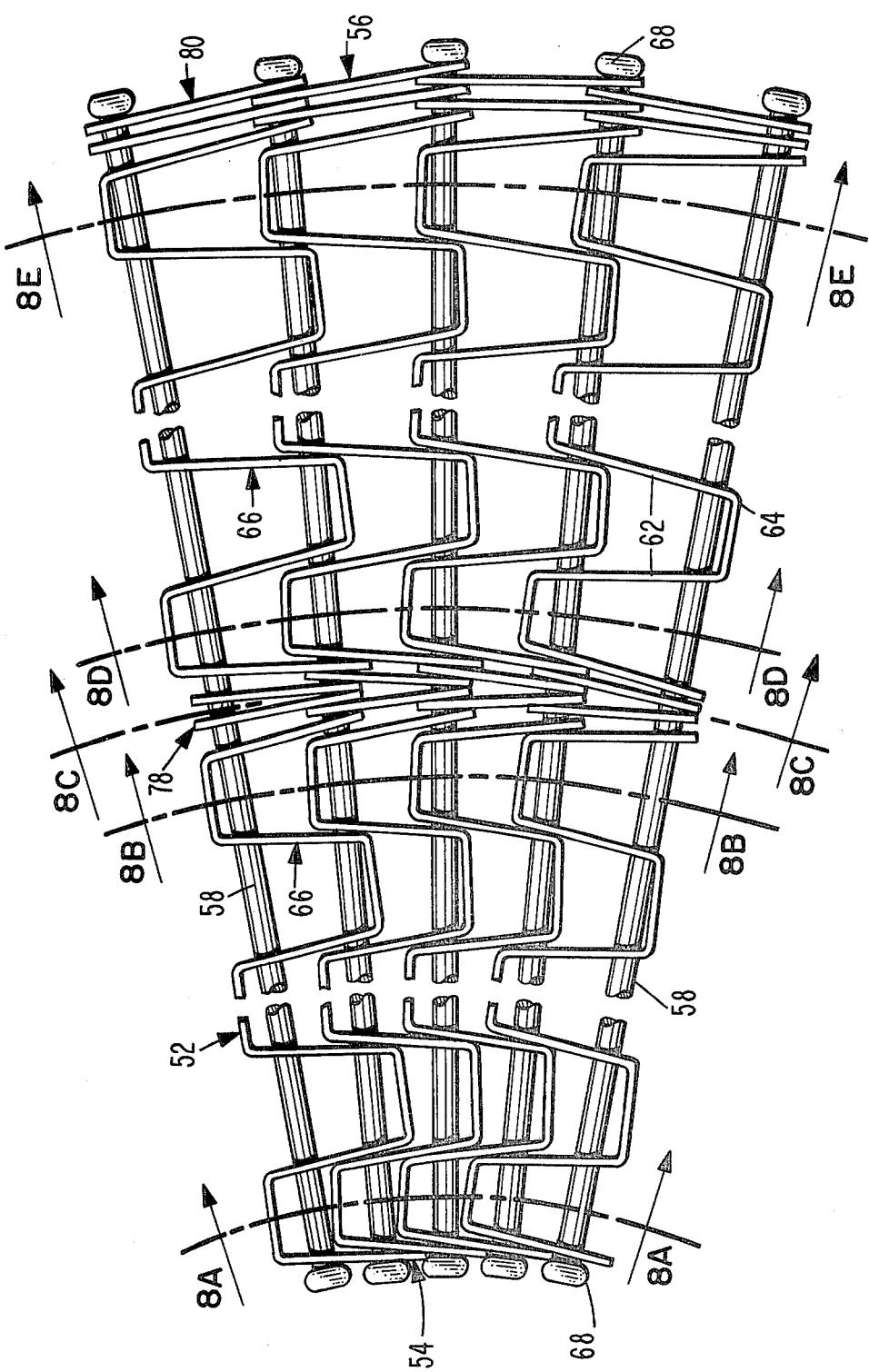
FIG. 7 is a plan view of the belt of FIG. 1 in an alternate orientation to follow a laterally curved path.
Figure 8:
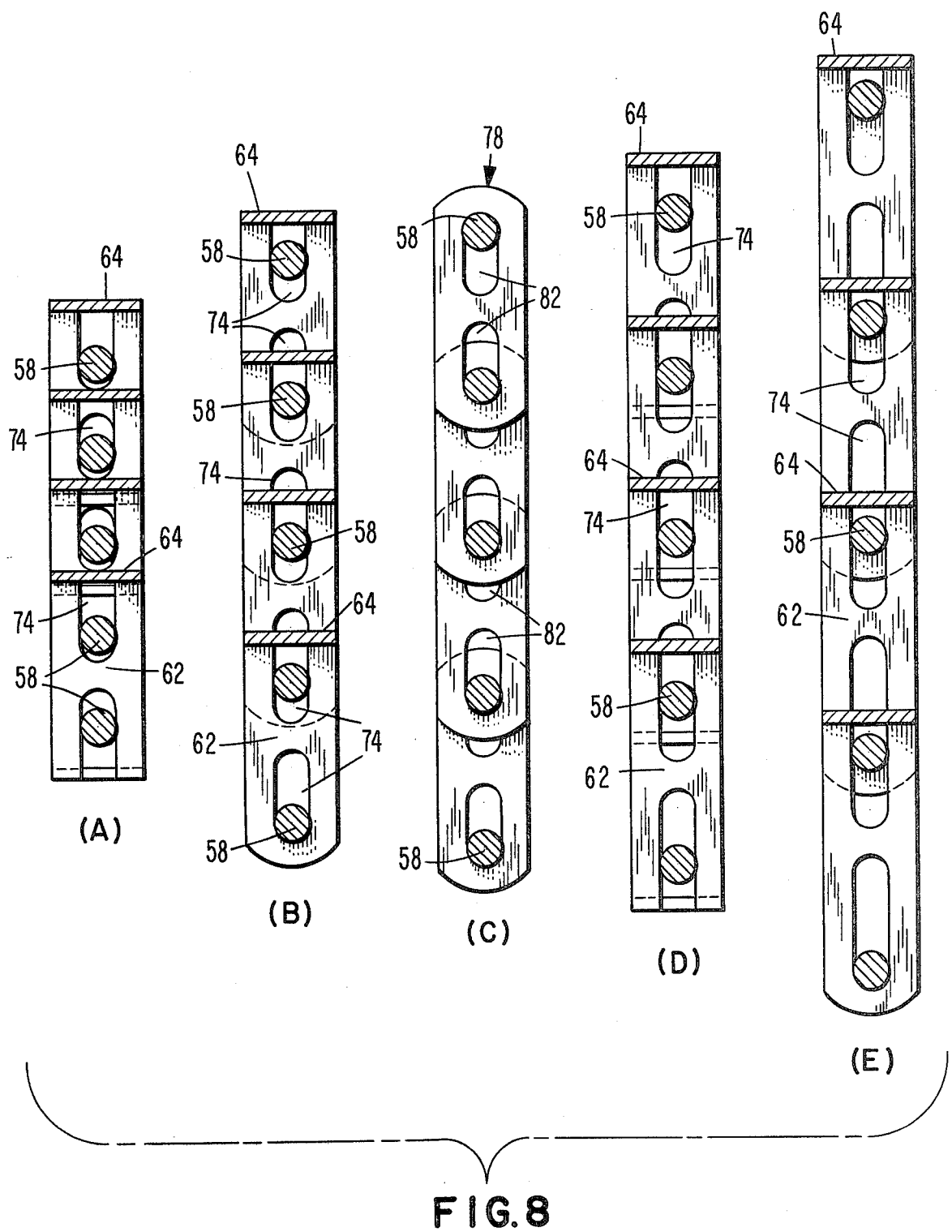
FIG. 8 (A-E) shows cross-sectional views of the belt of FIG. 7 taken along lines 8 (A-E)

Referring now to FIGS. 6-8, a second embodiment of the invention, which is a small radius conveyor belt 52, will be described. As with grid belt 2, flat wire belt 52 has an inner edge 54 and an outer edge 56 and comprises a plurality of longitudinally spaced, transversely disposed rods 58 suitably extending between the inner and outer edges 54 and 56. Rods 58 are pivotally interconnected by a plurality of transversely disposed flat wire members 70 and 72.

Each flat wire member 70 and 72 comprises a plurality of substantially longitudinally disposed tractive members 62 connected together at one end by transverse connecting members 64. Adjacent connecting members 64 extend between opposite ends of the tractive members 62 to form a plurality of rows of alternating, oppositely extending U-shaped links 66. Tractive members 62 slope outwardly in a longitudinal direction thereby allowing the links 66 to be disposed relative to one another in a partially nested relationship. The extremities of rods 54 are provided with enlarged heads 68 which prevent the flat wire members 60 from sliding off rods 54.

Flat wire members 70 are inner flat wire members and flat wire members 72 are outer flat wire members. The members 70 and 72 are disposed side-by-side and together span substantially the entire transverse width of the belt 52 between its inner and outer edges 54 and 56. When the flat wire members are so disposed, the U-shaped links 66 form a plurality of rows of links interconnecting the rods 58. Each of the tractive members 62 of the flat wire members is provided with two longitudinally spaced slots 74 for receiving adjoining rods 58 (FIG. 8). As shown in FIG. 8, one of the slots 74 is located adjacent the connecting member 64 which thus forms a front bearing surface for the rod 58. Although two elongated slots 74 are shown in each tractive member 62, the adjoining rods 58 may be received within only one continuous slot 74 or within one slot 74 at one end and a circular hole at the other end of tractive member 62. Outer flat wire members 72 are substantially longer than the inner flat wire members 70. In addition, slots 74 in the outer members 72 extend forwardly past the slots 74 in inner members 70 to allow the outer members 72 to be fully collapsed when the inner members 70 are fully expanded in the manner of the grid links 20 and 24 of the previously described belt 2.

A plurality of longitudinally disposed reinforcing bar links 78 and 80 are also preferably added to belt 52. Links 78 are arranged in a double, central row provided between the inner and outer flat wire members 70 and 72 and links 80 are arranged in a double, outer row located outside of member 72 along the outer edge 56 of belt 52. Alternatively, single rows or more than two rows of central or outer bar links may be used. Referring to FIG. 8, the bar links 78 and 80 are provided with two longitudinally spaced slots 82 adjacent each end thereof, corresponding to the slots 74 in the flat wire member 60, for receiving adjoining rods 58. However, the slots 82 in the central and outer bar links 78 and 80 have a pitch (longitudinal distance between bearing surfaces of successive links) at least as long and preferably slightly longer than the pitch of the slots 74 in the inner and outer flat wire members 70 and 72, respectively. The correlation between the pitch of the slots of the bar links 78 and the slots of the adjoining flat wire members 70 is such that the latter bear a substantial tractive load in the normal straight orientation and the bar links 78 bear a substantial tractive load in curved orientation. Preferably, the correlation is such that the flat wire member 70 bears substantially all of the tractive load in the straight orientation and the bar links bear substantially all of the tractive load in the curved orientation. To achieve the preferred correlation the pitch of the bar links is slightly longer than the pitch of the flat wire members. Neither the bar links 80 nor the flat wire member 72 bears any tractive load on the straightaway. However, in a particular curve when the tractive load is borne by the outer belt links as hereafter described, at least a substantial part of that load should be carried by the bar links 80. Again it is preferred that the bar links 80 have a slightly longer pitch than the flat wire members 72 correlated so that all of any tractive load on the outer links is carried by the bar links. Outer bar links 80 are substantially longer than the inner reinforcing bar links 78 as in the manner of the outer flat wire members 72.

Referring now to FIG. 6, belt 52 is shown traveling in its normal orientation following a straight path. In this orientation, inner flat wire members 70 are fully expanded with the rods 58 being disposed in a tractive engagement with the ends of slots 74 therein and the connecting members 64. Outer flat wire members 72 are fully collapsed with no tractive engagement occurring between the rods 58 and the members 72. thus, the tractive load on belt 52 is distributed evenly over the width of the inner flat wire members 70 in the belt's normal orientation. Thus, the flat wire members 70 define rows of inner links and central links along the inner and outer portions of the members 70 respectively. The inner and central links share the tractive load in the normal straight orientation.

As belt 52 begins traversing a horizontal curve, inner flat wire members 70 will begin collapsing from their fully expanded position and outer flat wire members 72 will begin expanding from their fully collapsed position, as shown in FIG. 7. As in the case of the grid type belt 2 and depending on the design of the flat wire belt 52, three alternate tractive conditions may occur as the belt 52 traverses horizontally curved paths of varying radii.

The first tractive loading condition is illustrated in FIG. 8 and occurs as soon as the belt begins to bend laterally from its normal straight orientation into a curved orientation. Thus, the inner links (along the inner portion of flat wire member 70) begin to collapse from their fully expanded tractive condition and transfer their load to the central belt links. At that point, the entire tractive load on the belt is carried by the central belt links. As previously described, it is preferred that all or substantially all of that load be carried by the central bar links 78. However, in some instances, a portion of the load may be borne by central belt links defined by the outer portion of the flat wire member 70.

The second loading condition occurs where the inner belt links collapse until the outer links become fully expanded and share the tractive load with the central links. When the outer links are thus loaded, it is preferred that all of such outer load be carried by the outer bar links 80. However, in some instances, a portion of the load may be carried by the outer links along the outer portion of the flat wire member 72.

The third loading condition occurs when the inner links further collapse from the second condition which results in partial collapse of the central links. In this third condition, the entire tractive load on the belt is transferred to the outer links. Again, it is preferred in that condition that the entire load be carried by the outer bar links 80 but some load could be carried by the outer links along the outer portion of the flat wire member 72.

As in the case of the grid belt 2, the flat wire belt 52 may be designed with the pitch of the various links correlated to permit the belt to reach one, two or all three of the alternative loading conditions. Specifically, if the inner belt links reach full collapse before the outer belt links reach full expansion, only the first loading condition can occur. If the inner belt links reach full collapse simultaneously as the outer belt links reach full expansion, the first and second loading conditions can occur. Finally, if the outer belt links reach full expansion before the inner belt links reach full collapse and the central belt links can thus partially collapse as the inner belt links collapse further, the belt can be oriented to reach all three of the loading conditions.

Reinforcing bar links 78 and 80, are preferably included on belt 52 because they alleviate fatigue failure of the flat wire members as more fully described in U.S. Pat. No. Re. 27,690. However, either the central bar links 78 or the other bar links 80 or both may be eliminated in instances where fatigue stress may not be a significant problem. In that event, the central belt links 66 on the outer portion of the inner flat wire member 70 (those links near the center of belt 52) bear the entire tractive load which otherwise would be carried by the central bar links 78. Thus, the rods 54 will tractively engage the connecting members 64. Similarly, the connecting members 64 of outer links 66 on the outer portion of flat wire member 72 will come into tractive engagement with the rods 58 when the members 72 are fully expanded in the second and third loading conditions. This tractive engagement between the inner and outer flat wire links 70 and 72 and rods 54 may also occur to some degree even when the central and outer bar links 78 and 80 are used as previously described.

It can be shown mathematically and experimentally that the belts according to the two embodiments set forth above can traverse much tighter radius curves than belts according to the prior art. Assuming commonly used link dimensions, it can be shown that the minimum inside radius for a typical prior art grid type belt shown in U.S. Pat. No. 3,225,898 is 2.14 times the width of the belt, while the grid type belt 2 according to the present invention can traverse a curve having a minimum radius 0.90 times the width of the belt. Similarly, for a typical prior art flat wire belt as shown in U.S. Pat. No. Re. 27,690, the minimum inside radius is normally 1.62 times the width of the belts, while for a flat wire belt 52 according to the present invention that minimum radius is reduced to 0.80 times the width of the belt. The ability of belts according to the present invention to traverse much tighter curves for a given width belt is a significant advantage.

The belts 2 and 52 are also advantageously used in conveying systems having a high tension sprocket type drive for the straight path and a low tension frictional edge drive, such as that shown in U.S. Pat. Nos. 3,348,659 and 3,682,295, for laterally curved paths. Because the heavy tractive load on the belts 2 and 52 is distributed over both the inner and central links when they are in their normal straight orientations, substantially smaller links can be employed than would be required on a center pull belt. Moreover, the belt can still adequately withstand the belt tension in the curved paths even though the tractive load is carried by only the central or outer links since such tension is very much lower than in the straight path. The grid links of belt 2 and the flat wire members of belt 52 may be formed of metal, plastic or any other suitable material.

Figure 9:
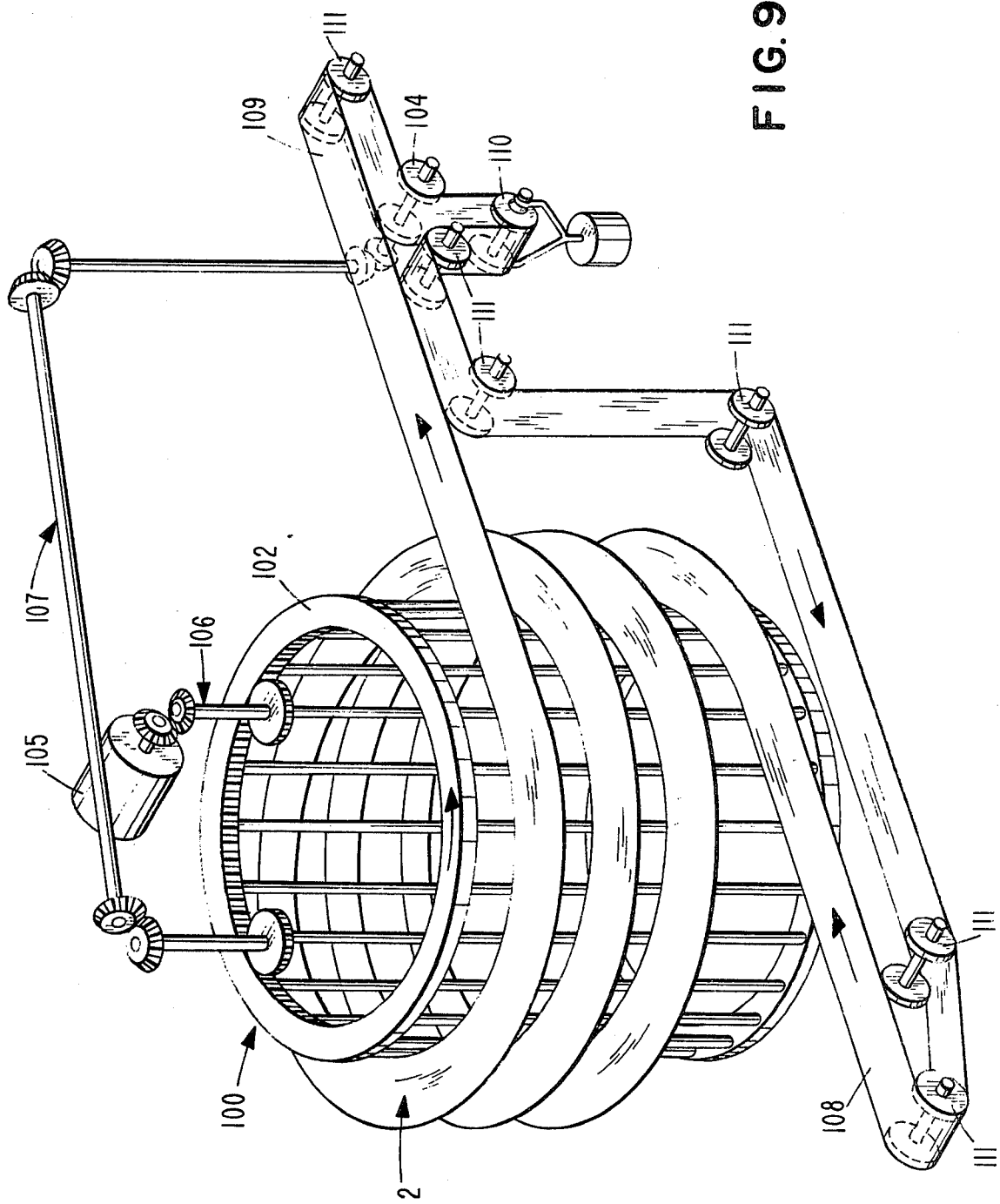
FIG. 9 is a schematic perspective view of a low tension conveying system including a small radius belt according to the present invention.

Referring now to FIG. 9 a spiral low tension conveying system 100 of the type shown in U.S. Pat. No. 3,348,659, can incorporate either of the belts 2 or 52 of the present invention. Since the low tension system is fully described in that patent, which is herein incorporated by reference, only a brief description will be given here. In such a low tension system 100, a cage type driving drum 102 frictionally engages the inner edge of belt 2 (or 52) to drive it with relatively low tension through a helical path around the drum. In addition, a positive sprocket drive 104 engages the belt 2 along a straight portion thereof. A motor 105 drives the drum 102 through gearing 106 and also drives the positive sprocket drive 104 through interconnected gearing 107. The belt 102 travels from the sprocket drive 104, past weighted tension take up roller 110 and idler pulleys 111 to a straight loading portion 108, then in helical loops around the drum 102 to a straight discharge portion 109 and around another idler 111 back to the drive sprocket.

As is well known, the tension on the belt 2 in the straight portion 109 is substantially higher than in the curved path. The positive drive 104 imparts sufficient tension to the belt to maintain the necessary frictional engagement with the drum. In some installations, a weighted tensioning roller could be used alone instead of the positive drive sprocket. In a spiral low tension conveying system 100, the maximum allowable loading on the belt is inversely proportional to the minimum inside radius which the belt can traverse. Since belts 2 and 52 can traverse a minimum curve with a radius over a twice as small as compared to grid and flat wire belts of the prior art, the allowable loading in a low tension system 100 according to the present invention can be more than doubled for a belt of a given width.

Although the present invention has been illustrated in terms of preferred embodiments, it will be obvious to one of ordinary skill in the art that numerous modifications may be made without departing from the scope of the invention which is to be limited only by the appended claims.

I claim:

1. A conveyor belt having a normal orientation to follow one path and alternate orientations with a collapsed inner edge and an expanded outer edge to follow alternate paths curved laterally to one side of said one path, which comprises:

a plurality of longitudinally spaced rods extending laterally across the belt and having inner and outer ends along the inner and outer edges of the belt and central portions therebetween;

central link means including central links arranged in at least one longitudinal row pivotally interconnecting the central portions of said rods, said central link means having a tractive condition with said rods in said normal orientation and in at least some of said alternate orientations;

egde link means aranged in at least one longitudinal row along each edge of the belt including inner links and outer links pivotally interconnecting the inner and outer ends of said rods, said edge link means being longitudinally collapsible and expandable along their said rows;

said inner links having a normal fully expanded and tractive condition in said normal orientation and a collapsed condition in said alternate orientations; and said outer links having a normal collapsed condition in said normal orientation and being expanded from said normal condition in said alternate orientations.

2. A conveyor belt according to claim 1, wherein said inner and outer links have longitudinal slots slidably receiving said rods to permit said longitudinal collapse and expansion of said inner and outer rows of links.

3. A conveyor belt according to claim 2, wherein said central links have longitudinal slots slidably receiving said rods so that said central links are longitudinally collapsible and expandable, at least one row of said central links being fully expanded when said central link means is in said tractive condition.

4. A conveyor belt according to claim 1, wherein at least one row of said central links is in said tractive condition in all of said belt orientations.

5. A conveyor belt according to claim 4, wherein at least one row of said inner links are fully collapsed before said outer links are fully expanded so that said central link means bear the entire tractive load in all of said alternate belt orientations.

6. A conveyor belt according to claim 4, wherein at least one row of said inner links are fully collapsed and at least one row of said outer links are fully expanded at one of said belt orientations.

7. A conveyor belt according to claim 3, wherein at least one row of said inner links are fully collapsed before said outer links are fully expanded so that said central link means bear the entire tractive load in all of said alternate belt orientations.

8. A conveyor belt according to claim 3, wherein at least one row of said inner links are fully collapsed and at least one row of said outer links are fully expanded at one of said belt orientations.

9. A conveyor belt according to claim 3, wherein at least one row of said outer links reach a fully expanded and tractive condition before said inner links reach a fully collapsed condition so that further collapse of said inner links results in collapse of said central link means from their tractive condition and the transfer to said outer links of the entire tractive load on the belt.

10. A conveyor belt according to claim 1, wherein said one path is a straight path.

11. A conveyor belt according to claim 1, wherein said inner, central and outer links each comprises a substantially U-shaped link body having a relatively narrow, closed end and a relatively wide, open end; said narrow ends being received in partially nested relationship within said wide ends of adjoining links, and said outer links being longer than said inner and central links.

12. A conveyor belt according to claim 1, wherein said inner, central and outer links are independent of and substantially spaced from each other, each of said links comprising a substantially U-shaped member having a closed end, an open end wider than said closed end, and stepped legs, said closed ends being received in partially nested relationship within said open ends of adjoining links with the stepped legs of adjoining links being in closely fitting sliding relationship relative to one another to minimize lateral movement between adjoining links during any collapse or expansion thereof.

13. A conveyor belt according to claim 1, wherein said outer links are longer than said inner and central links.

14. A conveyor belt according to claim 1, wherein said link means includes an inner flat wire member and an outer flat wire member disposed in close side-by-side relation along said belt, each said flat wire member integrally including a plurality of rows of links interconnecting said rods, said inner flat wire member defining along its inner portion said inner links and along its outer portion said central links, and said outer flat wire member defining said outer links.

15. A conveyor belt according to claim 14, wherein said central links further include at least one row of central bar links pivotally interconnecting said central portions of said rods, said central bar links being independent of said inner flat wire member and disposed between said inner and outer flat wire members, said central bar links and said inner flat wire member having correlated bearing surfaces to engage said rods so that at least a major portion of the tractive load on said belt is carried by said inner flat wire member when said belt is in said normal orientation and at least a major portion of said tractive load is carried by said central bar links when said belt is in said alternate orientations.

16. A conveyor belt according to claim 15, wherein said outer links further inlcude at least one row of outer bar links pivotally interconnecting said outer ends of said rods, said outer bar links being independent of said outer flat wire member and disposed adjacent the outer edge of said outer flat wire member, said outer bar links having bearing surfaces to engage said rods so that at least a substantial portion of any tractive load on said outer links is carried by said outer bar links.

17. A conveyor belt according to claim 14, wherein each link of said flat wire members has at least one longitudinally extending slot therein for receiving at least one of said rods.

18. A conveyor belt according to claim 17, wherein said outer flat wire members are longer than said inner flat wire members, the slots in said outer flat wire members extending forwardly past the slots in said inner flat wire members when the belt is in its said normal orientation.

19. A conveyor belt according to claim 17, wherein each of said flat wire members comprises a plurality of laterally spaced substantially longitudinally disposed, tractive members and a plurality of transversely disposed connecting members each connecting adjacent ones of said tractive members, adjacent ones of said connecting members extending between opposite ends of said tractive members so that said tractive and connecting members of each flat wire member form a plurality of alternating oppositely opening nestable links.

20. In a conveyor system having a substantially straight portion and a laterally curved portion, a conveyor belt having a normal orientation for following said substantially straight portion and an alternate orientation for following said curved portion with the belt defining a concave inner edge and a convex outer edge along said curved portion, said conveyor belt including a plurality of longitudinally spaced rods extending laterally across the belt and having inner and outer ends along the inner and outer edges of the belt and central portion therebetween; edge link means arranged in at least one longitudinal row along each edge of the belt including inner links and outer links interconnecting the inner and outer ends of said rods, said edge link means being collapsible and expandable along their said rows; tensioning means engaging said conveyor belt along said straight portion and friction edge drive means engaging said concave inner edge of said conveyor belt at a plurality of locations along said curved portion to frictionally drive said belt along said curved portion under a substantially lower tension than along said straight portion; the improvement wherein said conveyor belt further comprises central link means including central links arranged in at least one longitudinal row pivotally interconnecting said central portions of said rods, said central links means and said inner links having a tractive condition in said normal orientation to share the tractive load on the belt, said inner links collapsing as the belt curves laterally from said normal orientation, and said outer links having a collapsed and non-tractive condition in said normal orientation and expanding from said collapsed condition in said alternate orientation.

21. A conveyor system according to claim 20, wherein said tensioning means comprises a positive drive means.

22. A conveyor system according to claim 21, wherein said positive drive means includes sprocket means engaging said inner links and said central link means.

23. A conveyor system according to claim 20, wherein said friction edge drive means comprises a rotatable driving drum and said curved portion defines a helical path around said drum.

24. A conveyor system according to claim 23, wherein said straight portion extends outwardly from said drum and said tensioning means comprises a positive drive means.

* * * * *